United States Patent [19]

Komada et al.

[11] 3,966,198

[45] June 29, 1976

[54] SHEET CONVEYING DEVICE

[75] Inventors: Kenya Komada, Atsugi; Yoshiaki Kondo, Kawasaki, both of Japan

[73] Assignee: Ricoh Co., Ltd., Tokyo, Japan

[22] Filed: Dec. 18, 1974

[21] Appl. No.: 534,150

[30] Foreign Application Priority Data

Dec. 27, 1973 Japan.............................. 49-2081

[52] U.S. Cl. .................................. 271/265; 271/80; 271/270; 271/272

[51] Int. Cl.² ..................... B65H 5/06; B65H 29/20

[58] Field of Search ............ 271/242, 243, 246, 227, 271/265, 272, 273, 274, 266, 270, 80

[56] References Cited
UNITED STATES PATENTS

| | | | |
|---|---|---|---|
| 3,469,834 | 9/1969 | Stange et al. | 271/243 X |
| 3,863,913 | 2/1975 | Hirafuji | 271/265 |

Primary Examiner—John J. Love
Assistant Examiner—Bruce H. Stoner, Jr.
Attorney, Agent, or Firm—Cooper, Dunham, Clark, Griffin & Moran

[57] ABSTRACT

A device for transporting a flexible sheet from one device wherein the sheet is processed at one speed to another device wherein the sheet is processed at another speed. The device comprises two pairs of rollers, one pair of rollers disposed on the downstream side of the path of movement of the sheet and adapted to rotate at a rate higher than the rate of rotation of the other pair of rollers disposed on the upstream side thereof. The rotation of the pair of rollers disposed on the downstream side is temporarily initiated to cause the leading end portion of the sheet to be nipped thereby and then held for a time interval, so as to permit the portion of the sheet interposed between the two pairs of rollers to buckle up and form a loop before transporting at the higher rate is begun by reactivation of the downstream pair of rollers.

6 Claims, 8 Drawing Figures

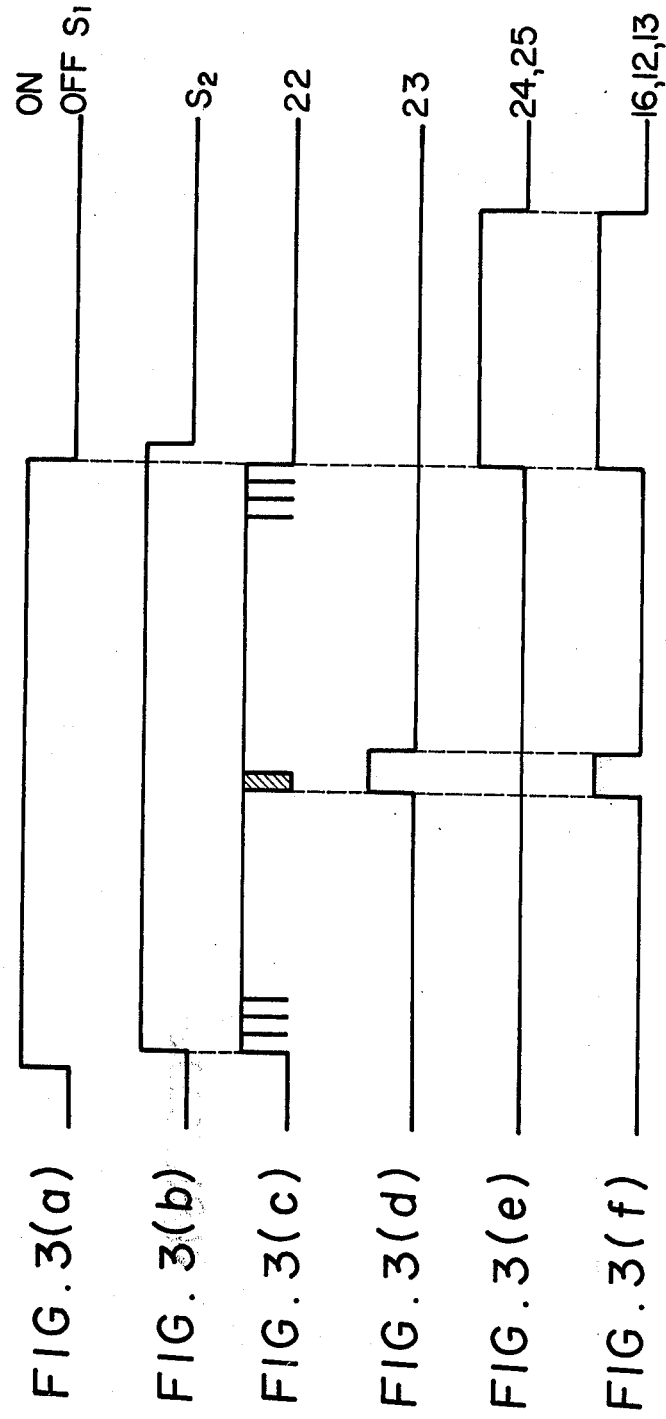

SHEET CONVEYING DEVICE

BACKGROUND OF THE INVENTION

This invention relates to a sheet conveying device provided with means for temporarily interrupting the movement of the leading end portion of a sheet transported from one device to another device.

When a sheet is moved in a first device at a predetermined rate and is transferred to a second device which moves it at a rate higher than the rate of movement of the sheet in the first device, there occurs the problem that the sheet will be pulled between the two devices due to the difference in the rates of movement, if the sheet is delivered to the second device before it is completely discharged from the first device. For example, in a facsimile system an original copy is transmitted by a transmitter and received by a receiver thereof, and a facsimile record of the original copy is printed as an electrostatic latent image on an electrostatic recording sheet at the receiver and developed into a visible image so as to produce a duplicate of the original copy. In such a case, if the recording sheet moves intermittently or at a lower rate in the recording device of the receiver and is transported at that rate to the developing device thereof where it is moved at a higher rate, irregularities will occur in the developed image. This is not desirable.

Proposals have been made to obviate the aforementioned disadvantage by causing the recording sheet to buckle up to a predetermined degree in such a manner that the trailing end of the sheet is released from the recording device before the sheet is tensioned by delaying the initiation of the movement of the sheet in the developing device, so that the leading end of the sheet released from the recording device will not be moved continuously into the developing device. In this system, the leading end of a sheet abuts against a pair of feed rollers on the developing device side whose rotation is temporarily interrupted and the sheet is continuously delivered from the recording device to cause the sheet to buckle up. However, the leading end of the sheet tends to be released from abutting engagement with the feed rollers due to the resilience of the material of the sheet before the size of the loop formed by the sheet reaches a satisfactory predetermined level.

SUMMARY OF THE INVENTION

The present invention provides a sheet conveying device whereby a recording sheet can be transported without any trouble from a first device, such as an electrostatic latent image recording device, wherein the recording sheet is processed at one rate to a second device, such as a developing device for developing the electrostatic latent image into a visible image, wherein the recording sheet is processed at another rate.

According to the invention, a sheet is caused to positively form a loop between first sheet means and second sheet feed means before the sheet is moved by the second sheet feed means, so that the sheet can be transported from the first device to the second device without any trouble even if the rate at which the sheet is processed in the second device is slightly higher than the rate at which the sheet is processed in the first device or the sheet is moved intermittently in the first device or by the first sheet feed means. The leading end of the sheet is positively nipped and temporarily held by the second sheet feed means when the sheet is caused to form a loop between the first and second sheet feed means, so that dislodging of the leading end of the sheet from the entrance to the second sheet feed means can be eliminated. This enables the sheet to positively form a loop which is sufficiently large to permit the sheet to be passed on to the second device from the first device without any trouble when the second sheet feed means is actuated.

BRIEF DESCRIPTION OF THE DRAWINGS

FIGS. 3($a$)–3($f$) are a time chart showing the timing of the operation of the various components of the device shown in FIG. 2.

DESCRIPTION OF A PREFERRED EMBODIMENT

Figure 1:
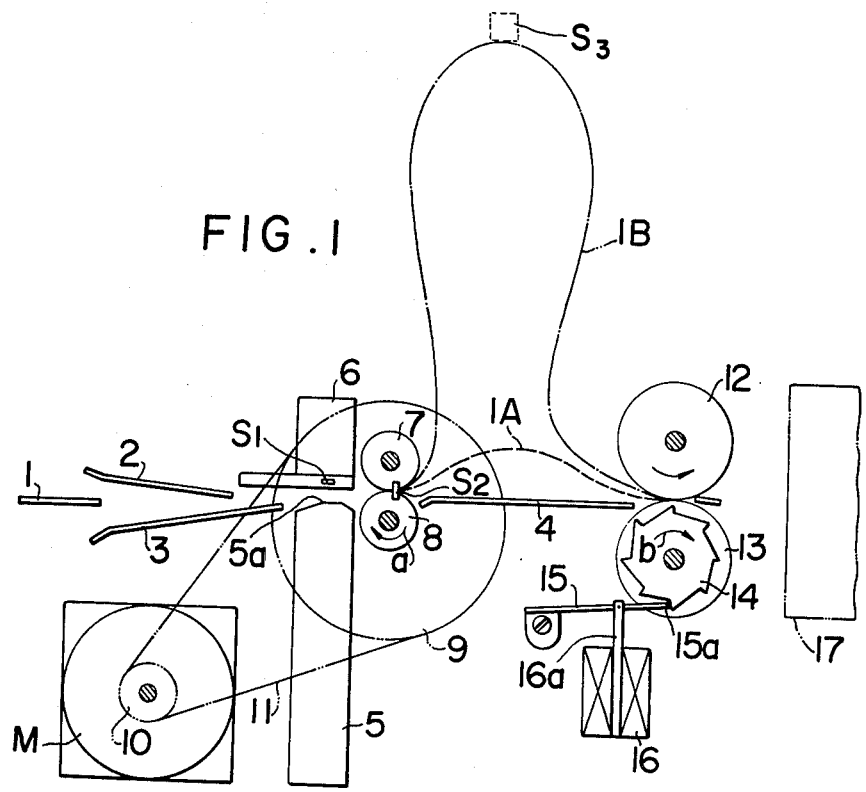
FIG. 1 is a view in explanation of the sheet conveying device comprising one embodiment of the invention.

One embodiment of the invention will be described with reference to the drawings. In FIG. 1, there is shown an electrostatic latent image recording device comprising a recording electrode means and an opposing electrode means disposed in spaced juxtaposed relationship for forming an electrostatic latent image on a recording sheet which moves along its path between the recording electrode means and the opposing electrode means. The electrostatic latent image formed on the recording sheet is then developed by a recording device. It is to be understood that the invention can have application in what is referred to as a one-side electrostatic recording device in which the recording electrode means and the auxiliary electrode means are both arranged at one side of the recording sheet.

Referring to FIG. 1, an electrostatic recording sheet 1 (hereinafter referred to as a sheet) is conveyed from left to right along guides 2, 3 and 4 arranged in its path of movement. Disposed rightwardly of guides 2 and 3 are the recording electrode means 5 and the opposing electrode means 6 disposed on opposite sides of the path of movement of the sheet 1. A first pair of feed rollers 7 and 8 are disposed rightwardly of the pair of electrode means 5 and 6, with the path of movement of the sheet 1 being directed between the two rollers 7 and 8. A chain 11 is trained over a sprocket wheel 9, which is formed integrally with one roller 8 (the lower roller as shown) and supported by the same shaft, and another sprocket wheel 10 mounted on a shaft of a step motor M. The roller 8 can be driven by the step motor M through chain 11 for rotation in the direction of an arrow $a$, and the other roller 7 is maintained in pressing engagement with the roller 8 and rotates in slaved relation.

First and second sensors S1 and S2, each comprising, for example, a light source and a light receiving element disposed on opposite sides of the path of movement of the sheet 1 for sensing the presence or absence of the sheet 1, are disposed anteriorly and posteriorly to the space between the electrode means 5 and 6 and rollers 7 and 8, respectively, as seen in the direction of movement of the sheet.

A second pair of feed rollers 12 and 13 are disposed rightwardly of the first pair of feed rollers 7 and 8 and spaced apart therefrom a substantial distance, with the path of movement of the sheet being directed by guide 4 and passing between the two rollers 12 and 13. One roller 13 (the lower roller as shown) is adapted to be driven by a suitable drive (not shown) through a friction means (not shown) to rotate in the direction of an arrow b. The rotation of the roller 13 in the direction of the arrow b is normally precluded by a free end 15a of a pivotal arm 15 engaging one of the teeth of a ratchet wheel 14 formed integrally with the roller 13 and mounted on the same shaft.

The pivotal arm 15 is connected to an actuator 16a of a plunger 16. Upon the plunger 16 being rendered operative, the actuator 16a moves the pivotal arm 15 so as to thereby release the free end 15a of the pivotal arm 15 from engagement with one of the teeth of the ratchet wheel 14.

A developing device 17 is arranged rightwardly of the second pair of feed rollers 12 and 13 as shown in FIG. 1.

Figure 2:
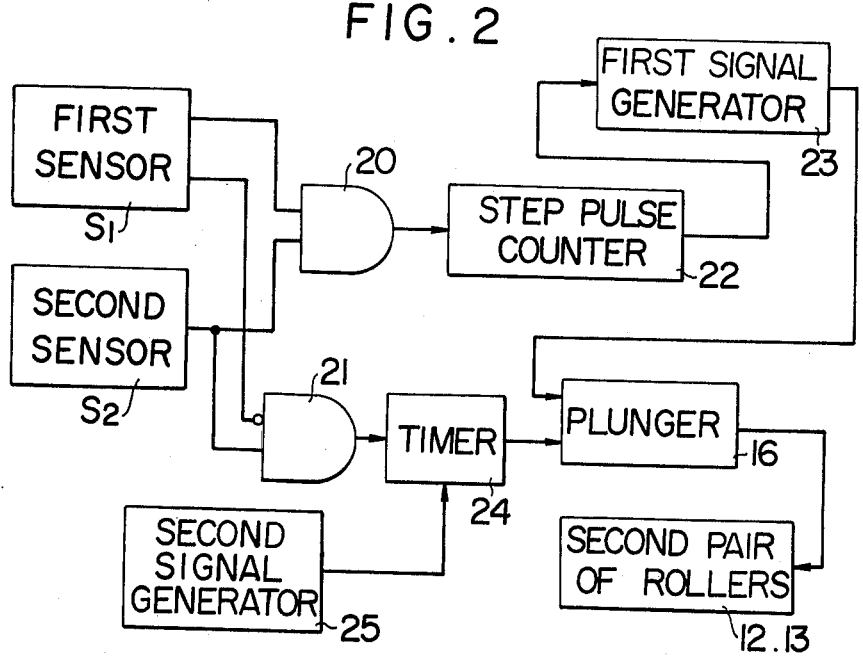
FIG. 2 is a block diagram showing the manner of operation of the device shown in FIG. 1.

The operation of the sheet conveying device constructed as aforementioned will now be described with reference to FIG. 1 and FIG. 2.

Upon a main switch (not shown) being turned on, the step motor M and the drive for roller 13 are rendered operative. This causes the first pair of feed rollers 7 and 8 to rotate, but the second pair of feed rollers 12 and 13 remain stationary because the rotation of roller 13 is precluded by the pivotal arm 15 engaging one of the teeth of the ratchet wheel 16. At this time, the opposing electrode means 6 is spaced apart from an electrode surface 5a of the recording electrode means 5. The sheet 1 is introduced into the conveying device as it moves along the path of its movement and reaches a position where the first sensor S1 is disposed. The sheet 1 further moves so that it passes between the electrode means 5 and 6 and reaches a position where the second sensor S2 is disposed whereupon it is nipped by the first pair of feed rollers 7 and 8.

Upon the two sensors S1 and S2 being rendered operative, an electric circuit (not shown) is rendereed operative to apply a standard voltage to pin electrodes on the electrode surface 5a of the recording electrode means 5. At the same time, the opposing electrode means 6 is moved downwardly by a mechanism (not shown), so that the opposing electrode means 6 draws near the back of the sheet 1. Then, a voltage is impressed selectively on the pin electrodes in accordance with external signals to thereby form an electrostatic latent image on the sheet 1.

When the two sensors S1 and S2 are rendered operative concurrently, a first control circuit 20 (See FIG. 2) is rendered operative, and causes a step pulse counter (hereinafter referred to as a counter) 22 to begin to count the number of drive pulses for the step motor M.

When the number of drive pulses counted by the counter 22 has reached a preset value, the counter 22 produces an output which actuates a first signal generator 23 adapted to produce a pulse signal of a short duration.

The preset value of the counter 22 is equal to the number of drive pulses which must be applied to the step motor M during the time from when the sheet 1 passes by the second sensor S2 till the sheet 1 buckles up as shown to a broken line position at 1A as a result of continuously moving after its leading end has reached and abutted the stationary second pair of feed rollers 12 and 13. Actuation of the first signal generator 23 applies a pulse signal of a short duration to the plunger 16, so that the free end 15a of the pivotal arm 15 is momentarily released from engagement with one of the teeth of the ratchet wheel 14. This allows the second pair of feed rollers 12 and 13 to rotate slightly and nip the leading end portion of the sheet 1.

As the sheet 1 is continuously moved by the first pair of feed rollers 7 and 8 while its leading end portion is held by the second pair of feed rollers 12 and 13 which again are rendered stationary after nipping the sheet 1, the sheet 1 begins to form a loop as indicated by a dash-and-dot line at 1B. Upon the trailing end of the moving sheet 1 passing by the first sensor S1, the latter is rendered inoperative and consequently the first control circuit 20 is rendered inoperative. As a result, the number counted by the counter 22 is reduced to zero.

Impression of the standard voltage on the pin electrodes of the recording electrode means 5 is interrupted as a result of the first sensor S1 being rendered inoperative. At the same time, the opposing electrode means 6 moves upwardly away from the recording electrode means 5.

While the first sensor S1 becomes inoperative, a second control circuit 21 is rendered operative by a signal produced as an output of the second sensor S2, so as to thereby activate a timer 24.

Actuation of the timer 24 causes a pulse signal of a relatively long duration to be produced by a second signal generator 25 and supplied to the plunger 16 through the timer 24. Upon the pulse signal of a relatively long duration being applied to the plunger 16, the free end 15a of the pivotal arm 15 is released from engagement with one of the teeth of the ratchet wheel 14 allows the second pair of feed rollers 12 and 13 to begin to rotate to feed the loop-shaped sheet 1 to the developing device 17.

Upon the trailing end of the sheet 1 passing by the second sensor S2 to render the latter inoperative, the second control circuit 21 is rendered inoperative. However, the second signal generator 25 is maintained in an operative condition by the timer 24. Thus, the second signal generator 25 continuously produces a signal pulse to hold the plunger 16 in an operative position so as to allow the second pair of feed rollers 12 and 13 to rotate until the trailing end of the sheet 1 moves through the second pair of feed rollers 12 and 13.

FIGS. 3(a)–3(f) are diagrams showing the chronological sequence in which the aforementioned components of the sheet conveying device are actuated. In these figures, the components are shown to be actuated on the left side of the time axis and are de-actuated and operate in going to the right side, thereby showing the lapse of time. An elevated portion of each line indicates the period during which each component is actuated. As shown, the first sensor S1, second sensor S2, counter 22, first signal generator 23, timer 24 and second signal generator 25, and plunger 16 and second pair of rollers 12 and 13 are rendered operative and inoperative as respectively indicated in FIG. 3(a), FIG. 3(b), FIG. 3(c), FIG. 3(d), FIG. 3(e) and FIG. 3(f).

In the aforementioned embodiment, the two sensors S1 and S2 are essentially provided for actuating and deactuating the two electrode means 5 and 6 of the recording device at opportune moments, but these sensors have been adapted to also be utilized for the conveying device according to the invention. This is why the two sensors are arranged as shown in FIG. 1. It is to be understood that the second sensor S2 may be arranged in any position as desired so long as it is disposed anteriorly to the second pair of rollers 12 and 13. For example in the embodiment shown and described, the second signal generator 25 is described as being actuated upon the trailing end of the sheet 1 passing by the first sensor S1, however, it is to be understood that the second signal generator 25 may instead be actuated by utilizing a detector or microswitch S3 (see FIG. 1) which detects the size of the loop formed by the sheet 1.

It is also to be understood that the counter 22 may be replaced by a timer or a delay member which delays the generation of a signal by the first signal generator 23 until the sheet 1 buckles up as shown in the broken line at 1A. When this is the case, the roller 8 may be driven by another type of motor than the step motor M. The invention is not limited to the combination of the plunger 16, pivotal arm 15 and ratchet wheel 14 as means for supplying and cutting off power for driving the second pair of feed rollers 12 and 13. In place of the aforesaid combination, a magnetic clutch may, for example, be employed.

We claim:

1. A sheet conveying device comprising:
    first transport means for transferring a flexible sheet at a first transfer rate;
    second transport means, arranged on the downstream side of said first transport means in a position spaced therefrom a distance smaller than the length of said sheet, for transferring the sheet from said first transport means at a second transfer rate higher than said first transfer rate;
    first sensor means for sensing the presence of said sheet and producing a first signal in response thereto;
    second sensor means, disposed downstream of said first sensor means and upstream of said second transport means, for sensing the presence of said sheet and producing a second signal in response thereto;
    first control means actuated in response to the simultaneous production of said first and second signals for detecting the amount of operation of said first transport means in transferring said sheet and producing a third signal when the detected amount reaches a preset value;
    catching means actuated in response to the production of said third signal for gripping and holding the leading end portion of the sheet temporarily after it reaches said second transport means during transferring to permit the portion of the sheet interposed between said first and second transport means to buckle-up; and
    second control means actuated by the cessation of the production of said first signal by said first sensor means following the simultaneous production of said first and second signals for initiating the transfer of the sheet by said second transport means following the gripping and holding of the leading end portion of the sheet by said catching means.

2. A device as in claim 1 wherein said second transport means comprises a pair of cooperating rollers which concurrently function as said catching means.

3. A device as in claim 1 whereein said first transport means comprises means for transferring said flexible sheet in intermittent equidistant steps and said first control means comprises means for counting the number of said steps and producing said third signal when the count therein reaches the preset value.

4. A device as in claim 3 wherein said first control means further comprises
    means for operating said counting means during the simultaneous sensing of a sheet by said first and second sensors and means for producing a fourth signal in response to said third signal to temporarily operate said catching means.

5. A device as in claim 1 wherein said control means comprises a timer.

6. A device as in claim 5 wherein said second control means further comprises
    means actuated by the cessation of the sensing of a sheet by said first sensor means for actuating said timer and means for producing a fifth signal during the operation of said timer to operate said second transport means until the sheet passes therethrough.

* * * * *